United States Patent [19]
Marcil

[11] 3,810,659
[45] May 14, 1974

[54] SUSPENSION DAMPING DEVICE

[76] Inventor: Jean Pierre Marcil, 22 MacDonald St., Maple Grove, Quebec, Canada

[22] Filed: Feb. 2, 1973

[21] Appl. No.: 328,902

[52] U.S. Cl. .................................. 280/276, 188/322
[51] Int. Cl. ............................................. B60g 11/00
[58] Field of Search ............ 280/276; 188/313, 318, 188/322

[56] References Cited
UNITED STATES PATENTS

| | | | |
|---|---|---|---|
| 1,571,788 | 2/1926 | Bramlette | 188/318 |
| 2,953,395 | 9/1960 | Turner | 280/276 |
| 2,196,089 | 4/1940 | Wallace | 280/276 X |
| 2,648,238 | 8/1953 | Raney | 188/313 X |
| 3,528,531 | 9/1970 | Schweller | 188/313 |

FOREIGN PATENTS OR APPLICATIONS

| | | | |
|---|---|---|---|
| 612,103 | 10/1946 | Great Britain | 280/276 |

*Primary Examiner*—David Schonberg
*Assistant Examiner*—Terrance L. Siemens

[57] ABSTRACT

A suspension damping device comprising an elongated tubular housing having a closed lower end for connection to an axle of a wheel and an open upper end having an elongated tube in sealed sliding engagement retained therein. A coil spring is located in the upper part of the tube and is retained between the upper end of the tube and a floating piston positioned in sealed sliding engagement in the tube. An upper and a lower oil chamber is formed in the tube and tubular housing below the piston. First and second passage means are provided between the first and second oil chambers with the second passage means having valve means which is responsive to lateral displacement of the wheel.

10 Claims, 7 Drawing Figures

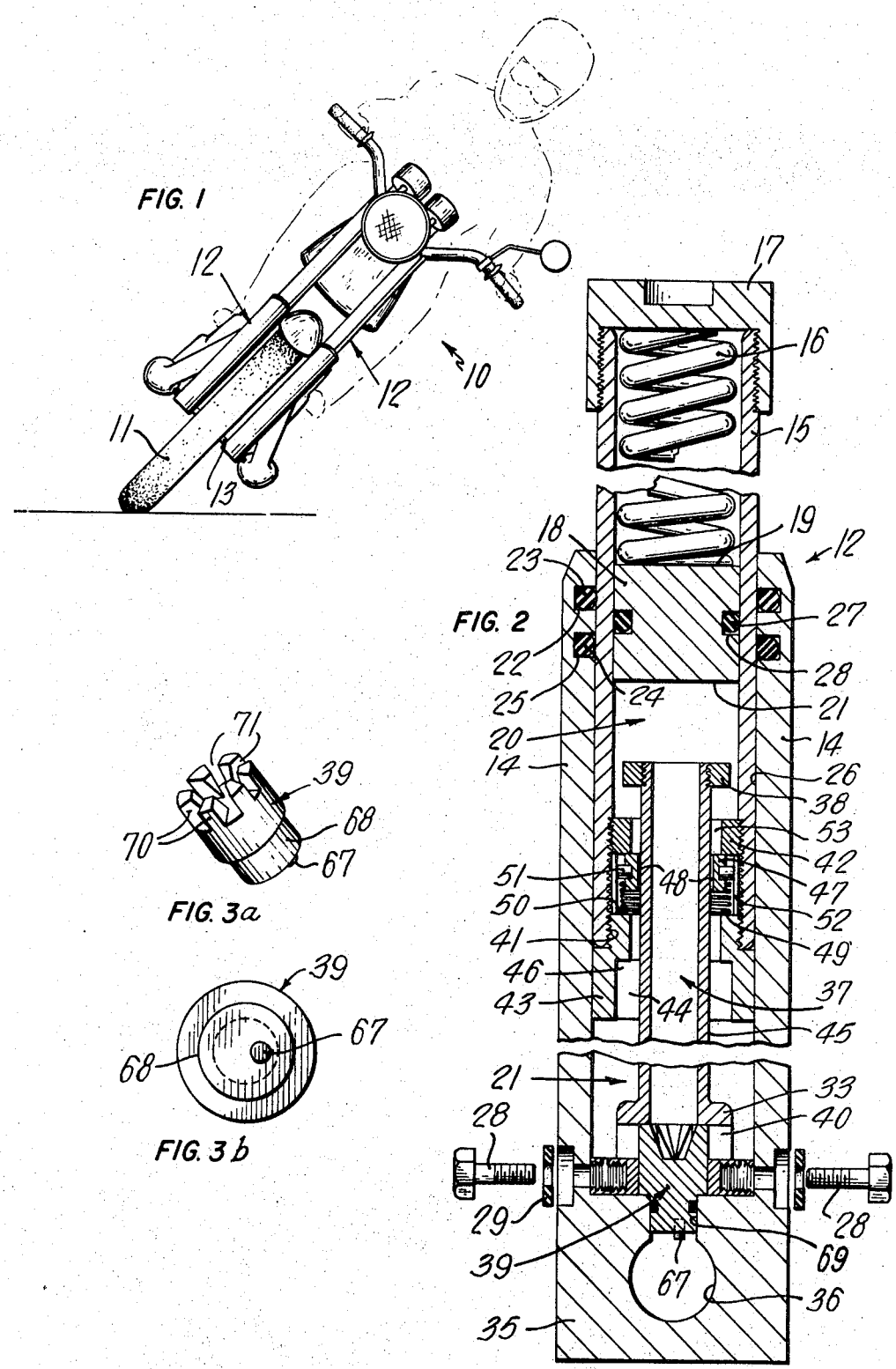

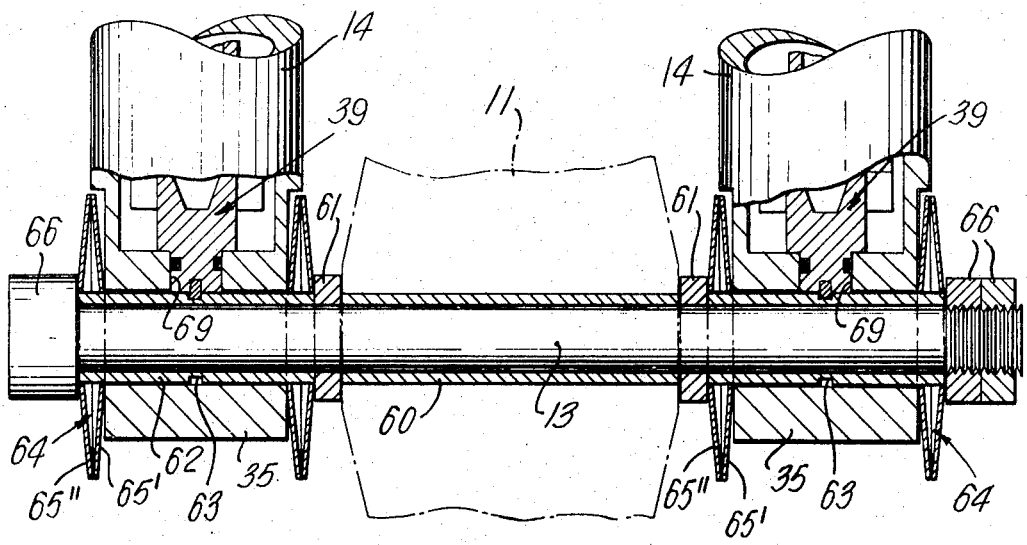
FIG. 4
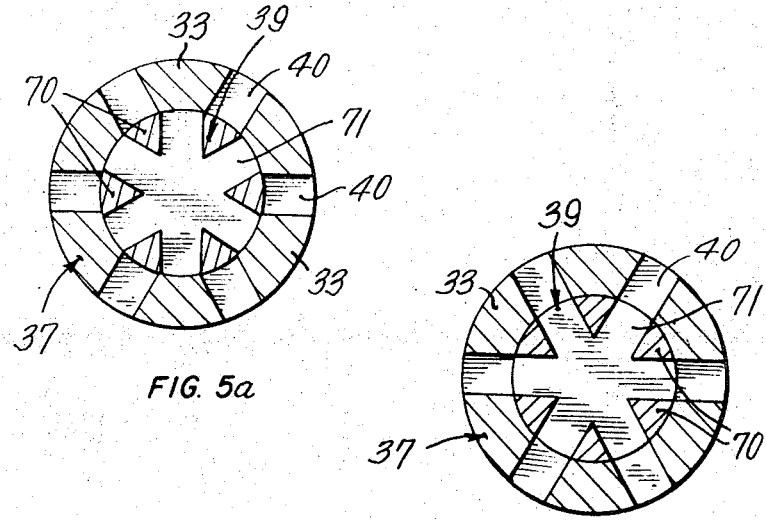
FIG. 5a
FIG. 5b

SUSPENSION DAMPING DEVICE

BACKGROUND OF THE INVENTION a. Field of the Invention

This invention relates to shock absorbing devices and more particularly to a damping suspension device for use on motor vehicles and particularly motorcycles.

b. Description of Prior Art

The motorcycle is a machine whose suspension operates when the motorcycle is at many different angles relative to the ground surface. When the machine is upright the suspension is working in a regular manner because the road shock forces are in direct alignment with the suspension. However, problems arise when the machine is banked in a sharp turn, for example, a 45° bank. In such a position where the suspension is not in direct line with the shock force, only a fraction of the road shock force is absorbed by the suspension, the remaining portion is transmitted to the machine unless something is done to dissipate it.

The accepted way to deal with the remaining portion of road shock force is to let the chassis flex allowing the front end to move laterally in a spring-like fashion. Also, the wheel flexes to help absorb the shock. This procedure rules out rigid frame and wheel structures. Monocoque wheels made of cast alloy are too rigid for most uses. The correct modulus of elasticity of a given frame has to be determined usually by the slow and expensive trial and error method, and rarely give complete satisfaction. Also, the bending and twisting of the chassis bring fatigue and eventually failures in the chassis construction. Cracks in steering head of a chassis often occur due to this problem. Also, because motorcycle wheels at high speed have a tremendous gyroscopic force, this problem is worsened by the fact that regular wire wheel with its tire and its tube is quite heavy. Therefore, when the wheel is forced to move laterally (the pivot point being the steering head) out of its spinning axis, the violent reacting force starts a complex oscillation in the machine and handlebars. Further, even if the chassis has elasticity, it has no damping as such, and is free to oscillate at its neutral frequency and these oscillations are very hazardous.

SUMMARY OF INVENTION

In the present invention, the chassis is not used as a suspension component, neither is the front wheel. Therefore, the chassis can be of rigid, tubular or monocoque construction. The design of the chassis is thus greatly simplified and there is no need for the chassis to have a determined elasticity. The chassis does not allow uncontrollable oscillations to take place. The chassis does not bend or twist as with prior art chassis, thus substantially eliminating failures caused by fatigue. The front wheel can also be cast of light alloy metal and have a tubeless tire. The immediate gains from the cast wheel results in a reduction of unsprung weight, reduction of the gyroscopic mass, ease of production, no maintenance, strength, etc, as compared to conventional wire wheels which are heavy, require attention, require more work to manufacture, and also ruling out the use of tubeless tires.

According to a broad aspect, the present invention provides a suspension damping device comprising an elongated tubular housing having a closed lower end for connection to an axle of a wheel and an open upper end having an elongated tube in sealed sliding engagement retain therein. A coil spring is located in the upper part of the tube and is retained between the upper end of the tube and a floating piston positioned in sealed sliding engagement in the tube. An upper and a lower oil chamber is formed in the tube and tubular housing below the piston. First and second passage means are provided between the first and second oil chambers with the second passage means having valve means which is responsive to lateral displacement of the wheel.

The suspension damping device of the present invention is a telescopic type fork with internal spring and two-way hydraulic damping. There is self-regulation of damping to maintain a constant vertical damping regardless of the angle of the vehicle. Normally, when a motorcycle vehicle is inclined at a steep angle, say a 45° angle, in a turn, the damper copes with the shock force at a 45° angle, the steeper the angle the greater the mechanical advantage to the damper. The result is the damper does not yield enough to fully absorb the shock. It absorbs only about one-half of the shock it would dissipate if the damper were in a vertical position, the remaining one-half is transmitted to the rest of the machine unless something is done. In the present invention the damping is softened by the provision of a by-pass valve activated by a sensor to soften the suspension when shocks are encountered when the vehicle is inclined.

The sensor is connected to the front wheel axle and senses the inclination of the vehicle and the force of the shock. The information is transmitted to the bypass valve which is in parallel with the standard metering orifice. The net effect is that the vertical damping remains constant regardless of the angle of the vehicle to the ground. Therefore, the damping device can still dissipate shocks when the vehicle is at a steep angle, i.e., 45°. Because the wheel is maintained on the same spinning axis, violent reacting gyroscopic forces are not encountered. Because the spring rate is not affected, the machine maintains the same attitude even when subjected to cornering force, etc. The change in damping takes place only when a shock is encountered. Further, the return of the oil in the damping device is assured by a free piston that separates the oil chamber from the coil spring and therefore no oil frothing takes place.

The proposed suspension uses a low spring rate and the springs are preloaded. In static use the support is the same as non-preloaded high rate springs. When a shock is encountered the lower rate spring yields more easily. Low spring rates are used in conjunction to an important damping, which gives more latitude when bypassing it.

BRIEF DESCRIPTION OF DRAWINGS

A preferred embodiment of the present invention will now be described with reference to the accompanying drawings in which:

FIG. 1 is a front view of a motorcycle having damping suspension devices of the present invention;

FIG. 2 is a fragmented sectional view of the damping suspension device;

FIG. 3a is a perspective view of the bypass valve;

FIG. 3b is a bottom view of the bypass valve;

FIG. 4 is a sectional view of an axle assembly utilizing damping suspension devices of the present invention;

FIG. 5a is a plan sectional view showing the bypass valve in the closed position; and FIG. 5b is a plan sectional view showing the bypass valve in the open position.

DESCRIPTION OF PREFERRED EMBODIMENTS

Referring to the drawings and more particularly to FIG. 1, there is shown generally at 10 a motorcycle vehicle having a front wheel 11 and two damping suspension devices 12 secured on each side of the front wheel 11 and between the axle 13 and the motorcycle chassis (not shown). The devices 12 are utilized as shock absorbers for supporting the machine in its normal plane relative to the front wheel and to absorb shocks imparted on the wheel and also each act as dampers to dissipate the energy transmitted by shocks.

FIG. 2 shows the construction of the damping suspension device 12 as comprising an elongated tubular housing 14 made of aluminium and adapted to telescopically receive in the upper end thereof, a fork tube 15 made preferably of quality cold-drawn mechanical steel. The fork tube 15 is secured to the steering framework by suitable fastening means (not shown). The end of the fork tube 15 is threaded and sealingly engaged by means of a cap 17 to retain a coil spring 16 in the upper portion of the tube 15 and in compression between the cap 17 and a floating piston 18 located for sliding motion in the tube 15. The spring 16 acts on the upper surface 19 of the piston 18 and oil pressure from the upper oil chamber 20 acts on the lower face 21 thereof. The lower portion of the tubular housing 14 constitutes a lower oil chamber 21. As the fork tube 15 is reciprocated in and out of the slider housing 14, oil will flow from the lower chamber to the upper chamber or vice-versa through various controllable passage means which will be described later. It can be seen that with this arrangement, the spring 16 can be preloaded by filling the oil chambers with additional oil to act on the piston 18 and further compress the spring 16.

An annular groove 22 is provided in the upper part of the inner surface of the slider tube to receive a scraper seal 23 therein. A suitable seal 24 is located below the scraper seal 23 in a further annular groove 25 thus providing sufficient sealing between the outer wall 86 of the fork tube 15 and the inner wall 26 of the slider housing. To prevent oil from seeping around the free floating piston 18 located in the fork tube 15, a seal 27 is located in an annular groove 28 provided about the circumference of the floating piston 18. The lower portion 35 of the tubular housing 14 is provided with a transverse bore 36 having a suitable diameter to receive the axle 13 of the motorcycle vehicle front wheel 11 and on which there is mounted a sleeve 62. Extending above and secured to the lower portion 35 of the tubular housing 14 is a damper tube 37 having a retaining ring 38 threadably engaged at the upper end thereof. The damper tube 37 is secured to the lower portion 35 by means of bolts 28 which are also provided as bleeding screw. A suitable O-ring seal 29 provides a leakproof connection of bolt 28. As shown in the drawings, the damper tube 37 extends into the upper oil chamber 20 under the free floating piston 18. The tube 37 preferably has a small taper and is provided at the base thereof with a bypass valve 39. Further, the base of the damping tube 37 is provided with a plurality of ports 40 disposed equidistantly about the circumference of the base of the damping tube, as is more clearly shown in FIGS. 5a and 5b. Unlike conventional designs, the damping tube 37 does not support the weight of the motorcycle vehicle. In the present design, the oil located in chambers 20 and 21 is used as a structural compressive member. Therefore, the damper tube 37 need not be constructed of very strong material. This results in a further saving in the total weight of the damping suspension device and a reduction in the unsprung weight when the vehicle is subjected to an upward shock in the direction of the machine. Therefore, with this present design, it is possible to cast the damping tube 37 out of light aluminum or other suitable light material.

The lower inner surface of the fork tube 15 is threaded as at 41 and a damping disc support 42 is threadably received in the upper part of the threaded portion 41. In the lower part of the threaded portion 41, there is threadably secured a clamp disc valve retaining ring 43 which extends in flush sliding engagement with the inner wall 26 of the slider housing 14. A passageway 44 is provided between the outer wall 45 of the damper tube 37 and the inner surface 46 of the retaining ring 43 whereby to permit passage of oil between the lower oil chamber 21 and the upper oil chamber 20.

Between the damping disc support ring 42 and the retaining ring 43 there is provided a space wherein there is located an annular clamp disc valve 47 which is spring biased against the lower surface of the ring 42 and spaced in close proximity to the outer wall 45 of the damper tube 37 whereby to provide a restricted passageway 48 whereby the oil will pass when flowing from the lower to the upper oil chamber. As can be seen, a passageway 53 also exists between the inner surface of the ring 42 and the outer wall 45 of the damper tube. The clamp disc valve 47 is spring biased by means of the coil spring 49 which is retained between the disc valve 47 and the upper annular surface 50 of the retaining ring 43.

The damping disc valve 47 regulates the bound damping of the suspension device 12. As explained, the oil has to flow between the damper tube 37 and the damping disc valve 47 and the restrictive passage 48 constitutes a metered passage. Further, the damping disc valve 47 is maintained in position away from the sleeve 52 by means of a plurality of guide keys 51 which slide on the sleeve 52 positioned between the rings 42 and 43. On the bound stroke of the device 12, the damping disc valve 47 is pushed upwardly and the oil will flow in the restricted passage or metered passage 48. On the rebound stroke, the oil pushes downwardly on the damping disc valve 47 which moves downwardly against the upward push of the spring 49 whereby oil will flow downwardly from the upper chamber to the lower chamber through the restrictive passage 48.

Referring now to FIG. 4, there is shown the manner in which the damping suspension devices 12 are secured to the front wheel axle 13. The axle 13 is provided with a sleeve 60 which supports the standard bearing assembly (not shown) and the wheel 11 of the vehicle. Rings 61 are provided on each end of the sleeve 60 and if desired, these can be integrally formed with the sleeve 62. A further sleeve 62 is positioned on each side of each ring 61 and are each provided with a transverse annular groove 63 in the upper surface thereof. The lower portion 35 of the suspension device 12 is then inserted over each sleeve 62 and each between two Bellville type spring discs 64 which are each formed by two convex outer walls 65' and 65" abutting along their peripheral outer edge. The spring discs 64 control the movement of the axle unit laterally. Two securing nuts 66 are then threadably secured to the end of the axles 13 to retain the lower portion 35 of the device 12 between the two spring discs 64.

Referring now to the additional figures, it can be seen that the bypass valve 39 is provided with a circular crank pin 67 in the lower part thereof and which pin extends within the groove 63 in the sleeve 62. The bypass valve 39 is circular in cross-section having a lower portion 68 of reduced cross-section and which extends within the circular bore 69 which communicates with the transverse bore 36 in which the axle 13 is received. A plurality of fingers 70 are formed integral with the upper part of the bypass valve 39 and define a plurality of ports 71 therebetween. With the suspension device 12 in position as shown in FIG. 4, the pin 67 rests within the groove 63 as described earlier.

FIG. 5a shows the bypass valve 39 in its normal closed position with the ports 71 thereof being out of alignment with the ports 40 within the lower flared portion 33 of the damper tube 37. As can be seen from this embodiment, there are six ports located about the circumference of the bypass valve 39 and a maximum rotational displacement of 30° of the valve 39 is sufficient to align the ports 71 with the ports 40 whereby oil from the lower chamber 21 will flow to the upper chamber 20 (see FIG. 5b). Also, the pin 67 is offset whereby to provide the desired displacement of the valve.

The operation of the invention will now be described. The weight of the vehicle 10 is supported on oil which is encased in the tubular housing 14 and tube 15 and sealed by the floating piston 18 located in the fork leg tube 15. The free piston 18 is held between the main coil spring 16 retained in the upper part of the tube 15. Unlike conventional designs, the damper tube 37 does not support the weight of the vehicle. The damper tube 37 therefore can be made of very light material (reducing unsprung weight) since it does not need to be a structural member. It can be cast of a light alloy metal. The reason for the piston 18 extending freely above the bottom of the lower chamber 21 and into the tube 15, is that the upper oil chamber 20 is of smaller cross-sectional area than the lower oil chamber 21 and the piston 18 has to travel longer distances than the tubular housing 14. Because the piston 18 is floating and under sprung pressure, it permits a positive return of oil into the lower oil chamber 21. There is no backlash in the damper from any internal movement and further because the system is always filled with oil, no frothing of the oil can take place. Conventional dampers rely on gravity for oil return and very often, there is a lack of oil in the lower chamber, the result being a very impaired damping.

The damper tube 37 is preferably tapered so the damping goes on increasingly. The damper tube 37 has a smaller outside diameter than the orifice of the chamber dividing disc 42. The difference in diameter creates an annular orifice 53. The damper tube 37 rides in the orifice of the damping disc 47 but it does not touch the disc 47. Fitting a damping disc 47 with a different inner diameter will alter the area of the orifice 48 and control the damping. When the motorcycle vehicle 10 is in a vertical position and a shock is encountered from the road, the damping is achieved by the oil from the bottom oil chamber 20 that is forced out through the annular metered orifice 48. The oil progressively fills the upper oil chamber 20 by pushing on the free piston 18 which pushes on the coil spring 16. The return stroke of the device 12 is as follows. The spring 16 pushes the piston 18 which pushes the oil back down into the lower oil chamber 21 through the metered orifice 48 and also between the area defined between the sleeve 52 and the outside wall of the damping disc valve 47 and around the keys 51. Thus, the suspension provides a fairly stiff damping on the bound stroke with a more soft damping on the rebound stroke.

When the machine is inclined in a turn, as shown in FIG. 1, and a shock from the road is encountered, the damping is achieved as follows. As shown in FIG. 4, the damping suspension device is supported on a sleeve 62 which is supported over the axle 13. When the vehicle encounters a shock, a lateral force will be applied on the axle of the front wheel 11 of the vehicle and this will operate a sensing system described below.

As shown in FIG. 4, the damping suspension device 12 is supported on a sleeve 62 coupled to the bypass valve 39. A sensing system is provided by the wheel 11, the axle 13, the rings 61, the sliding sleeves 62, and nut 66 all joined together as one unit. A lateral force applied on the wheel would cause this sensing unit to displace itself laterally with respect to the suspension devices 12 causing the bypass valve 39, engaged with the sleeve 62, to turn to its open position. During this displacement, some of the discs 64 will be compressed on the housing 14. The lateral distance required for the valve to open is very small (0.100 of an inch or less). By opening the bypass valve 39, the oil from the bottom chamber is provided with a further channel in communication with the upper chamber, other than the metered orifice 48. Thus, the oil flows inside the tube 37 and into the upper chamber 20. By calibrating the strength of the Bellville spring discs 64, the correct bypassing lateral pressure can be achieved. Also, it is preferable that the ports of the bypass valve 39 have a square configuration to provide a more linear response for modifying the damping.

I claim:

1. A suspension damping device comprising an elongated tubular housing having a closed lower end for connection to an axle of a wheel and an open upper end having an elongated tube in sealed sliding engagement retained therein, a coil spring in the upper part of said tube and retained between the upper end of said tube and a floating piston positioned in sealed sliding engagement in said tube, an upper and lower oil chamber formed in said tube and tubular housing below said piston, first and second passage means between said first and second oil chambers, said second passage means having valve means responsive to lateral displacement of said wheel.

2. A suspension damping device as claimed in claim 1 wherein said second passage means is a damper tube secured in said lower oil chamber and extending into said upper oil chamber, said valve means being secured in said damper tube, one or more ports in said damper tube for passage of said oil from said lower to said upper oil chamber, said valve means normally closing said one or more ports and adjustably opening same in response to said lateral displacement of said wheel.

3. A suspension damping device as claimed in claim 2 wherein said valve means is a circular valve member having one or more ports in an upper portion thereof, said valve upper portion being received in close frictional contact in said tube lower end and positioned adjacent said one or more ports of said damper tube, engageable means in the lower portion of said valve member and engageable with said wheel axle to rotate said valve member and position said ports of said valve member in contact with said ports of said damper tube to permit oil to flow from said lower chamber to said upper chamber.

4. A suspension damping device as claimed in claim 3 wherein said engageable means is a crank pin extending in a trough bore in said tubular housing lower end, said axle having a sleeve secured thereover and extending through said bore, an annular transverse groove on the upper surface of said sleeve for receiving said crank pin therein, said sleeve and axle being displaced laterally in response to lateral displacement of said wheel to cause said valve member to rotate.

5. A suspension damping device as claimed in claim 4 wherein a spring disc is positioned over said sleeve on each side of said tubular housing lower end and in abutment on one side thereof with said housing, an annular ring over said axle between said sleeve and said wheel and in abutment with the outer side of said spring disc, said spring discs being flexed by lateral displacement of said wheel, wheel axle, annular ring and sleeve.

6. A suspension damping device as claimed in claim 5 wherein said wheel is mounted on a further sleeve which is in abutment with said annular ring, said sleeves and said annular ring being fixedly secured to said axle.

7. A suspension damping device as claimed in claim 2, wherein a first and second annular ring are secured in the lower end of said elongated tube about said damper tube, said first and second rings being spaced apart and each defining an annular passage between their inner surface and the outer surface of said damper tube, a damping disc valve between said first and second rings to control the passage of oil between said upper and lower oil chambers.

8. A suspension damping device as claimed in claim 7 wherein said damping disc valve is spring biased against said first annular ring to provide a first restrictive oil passage from said lower chamber to said upper chamber, said first restrictive passage being provided between said disc and said damper tube.

9. A suspension damping device as claimed in claim 8 wherein said damping disc valve provides a further oil passage when oil is displaced from said upper chamber to said lower chamber, said further oil passage being opened by downward oil pressure on said damping disc displacing said disc downwardly in said space between said first and second rings whereby oil will flow downwardly through said first restrictive oil passage and through a further passage between said damping disc and said tube inner surface.

10. A suspension damping device for use on a motorcycle vehicle having a frame and a pair of wheels mounted on respective axles, said suspension device being secured on each side of said front wheel and between the axle thereof and said motorcycle frame, each said damping device having an elongated tubular housing having a closed lower end for connection to an axle of a wheel and an open upper end having an elongated tube in sealed sliding engagement retained therein, a coil spring in the upper part of said tube and retained between the upper end of said tube and a free floating piston positioned in sealed sliding engagement in said tube, an upper and lower oil chamber formed in said tube and tubular housing below said piston, first and second passage means between said first and second oil chambers, said second passage means having valve means responsive to lateral displacement of said wheel.

* * * * *